(12) United States Patent
Krohn et al.

(10) Patent No.: US 10,293,769 B2
(45) Date of Patent: May 21, 2019

(54) ROUTING AND SECURING SYSTEM WITH NESTED SUPPORT ARRANGEMENT

(71) Applicant: CNH Industrial America LLC, New Holland, PA (US)

(72) Inventors: Martin L. Krohn, DeGraff, MN (US); Glen Gunderson, Benson, MN (US); Jade Abner, Benson, MN (US); Stephen Stuhr, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 64 days.

(21) Appl. No.: 15/498,016

(22) Filed: Apr. 26, 2017

(65) Prior Publication Data

US 2017/0314706 A1 Nov. 2, 2017

Related U.S. Application Data

(60) Provisional application No. 62/328,753, filed on Apr. 28, 2016.

(51) Int. Cl.
| | |
|---|---|
| *F16L 3/22* | (2006.01) |
| *B60R 16/08* | (2006.01) |
| *B60R 16/02* | (2006.01) |
| *F16M 13/02* | (2006.01) |
| *F16L 3/06* | (2006.01) |
| *F16L 3/223* | (2006.01) |
| *F16L 3/237* | (2006.01) |

(52) U.S. Cl.
CPC .......... *B60R 16/08* (2013.01); *B60R 16/0215* (2013.01); *F16L 3/06* (2013.01); *F16L 3/2235* (2013.01); *F16L 3/237* (2013.01); *F16M 13/02* (2013.01)

(58) Field of Classification Search
USPC ........................................................ 248/68.1
See application file for complete search history.

(56) References Cited

U.S. PATENT DOCUMENTS

| | | | | | |
|---|---|---|---|---|---|
| 2,231,462 | A | * | 2/1941 | Cobb | F16L 3/2235 165/162 |
| 3,638,172 | A | | 1/1972 | Adam | |
| 3,872,881 | A | * | 3/1975 | Miller | E02F 3/65 137/355.17 |
| 4,431,152 | A | * | 2/1984 | Reed, Jr. | H02G 3/0683 248/65 |
| 4,658,854 | A | * | 4/1987 | Hopkins | F16L 3/223 137/355.17 |
| 4,775,121 | A | * | 10/1988 | Carty | F16L 3/2235 24/543 |

(Continued)

FOREIGN PATENT DOCUMENTS

AU 20101522 A 1/2015

*Primary Examiner* — Monica E Millner
(74) *Attorney, Agent, or Firm* — Rebecca L. Henkel; Rickard K. DeMille (57) ABSTRACT

A routing and securing system with a nested support arrangement is provide that includes a base block and a retainer in a nested relationship with respect to each other. Routed components which may include various ones of hoses, lines, and wire harnesses of vehicles are captured between the base block and retainer at predetermined positions to allow for straightforward and repeatable installation of the routed components.

16 Claims, 8 Drawing Sheets

(56) References Cited

U.S. PATENT DOCUMENTS

| | | | | |
|---|---|---|---|---|
| 5,246,189 | A * | 9/1993 | Compton | F16L 3/01 |
| | | | | 248/52 |
| 5,742,982 | A | 4/1998 | Dodd et al. | |
| 6,602,016 | B2 | 8/2003 | Eckart et al. | |
| 7,328,873 | B2 | 2/2008 | Suzuki et al. | |
| 7,464,966 | B2 * | 12/2008 | Miyajima | F16L 5/10 |
| | | | | 285/124.3 |
| 7,540,133 | B2 * | 6/2009 | Zacharias | A01B 59/002 |
| | | | | 248/74.2 |
| 7,653,987 | B2 * | 2/2010 | Tokuda | B60K 7/0007 |
| | | | | 140/92.1 |
| 7,802,761 | B2 | 9/2010 | Volchko | |
| 8,342,474 | B2 | 1/2013 | Gilbreath | |
| 8,534,624 | B2 | 9/2013 | Lunitz et al. | |
| 8,590,847 | B2 | 11/2013 | Guthke et al. | |
| 9,038,970 | B2 | 5/2015 | Kataoka et al. | |
| 9,190,816 | B2 | 11/2015 | Johnson | |
| 9,193,428 | B2 | 11/2015 | Reed et al. | |
| 9,938,998 | B2 * | 4/2018 | Krohn | F16B 5/00 |
| 2005/0172459 | A1 * | 8/2005 | Ryan | H02G 3/24 |
| | | | | 24/115 R |
| 2012/0280092 | A1 * | 11/2012 | Barre | F16L 3/1091 |
| | | | | 248/68.1 |
| 2014/0259620 | A1 | 9/2014 | Hicks et al. | |
| 2015/0192225 | A1 | 7/2015 | Vo | |
| 2015/0192227 | A1 | 7/2015 | Masters et al. | |
| 2015/0327429 | A1 | 11/2015 | Koch | |
| 2017/0314705 | A1 * | 11/2017 | Krohn | F16L 3/2235 |

* cited by examiner

ROUTING AND SECURING SYSTEM WITH NESTED SUPPORT ARRANGEMENT

CROSS REFERENCE TO RELATED APPLICATIONS

This is a non-provisional application based upon U.S. provisional patent application Ser. No. 62/328,753, titled "Routing and Securing System with Nested Support Arrangement," filed Apr. 28, 2016, which is incorporated herein by reference.

FIELD OF THE INVENTION

The invention relates generally to securing hydraulic hoses and wire harnesses or other elongate routed components of vehicles and, in particular, to a routing and seeming system with a nested support arrangement having nested components for routing and securing routed components such as hoses, lines, and harnesses of vehicles.

BACKGROUND OF THE INVENTION

Vehicles, including self-propelled off-road agricultural vehicles, towed implements, and other towed and self-propelled vehicles are getting larger and more complex, some of which have sophisticated on-board systems and components to perform various vehicle functions. Numerous hoses and lines such as hydraulic hoses, fuel lines, and A/C and heater lines are required for operation of the systems and/or components. Bulky wire harnesses are required for power and signal transmission between on-board systems and/or components. Other wire harnesses are not bulky but still need to be routed. Routing and securing hoses, lines, and harnesses can be an important part of vehicle design in order to provide a neat appearance while offering protection for the hoses, lines, and harnesses. However, the lengths and bulk of the hoses, lines, and harnesses of large and complex off-road agricultural vehicles make them difficult to work with, which can make repeatable installation challenging and time-consuming.

SUMMARY OF THE INVENTION

A routing and securing system with a nested support arrangement having nested components. The nested components facilitate consistent routing and securing of elongate routed components such as hoses, lines, and harnesses of vehicles in a straightforward and repeatable manner that provides a neat appearance and improves access and serviceability. The system holds at least some of the routed components transversely spaced from each other to mitigate rubbing of routed components against each other or other components of the off-road agricultural vehicle, preventing damage.

According to one aspect of invention, a routing and securing system, for routing and securing routed components of a vehicle such as an off-road agricultural vehicle having a chassis. The system may include multiple routed components extend between different locations relative to the chassis. A nested support arrangement for routing and securing the routed components relative to the chassis is provided. The nested support arrangement may include a base block supported relative to the chassis. The base block may have an outer perimeter defining a base block outer perimeter shape. Multiple receptacles may be provided that are spaced from each other with each of the receptacles extends inwardly into the base block from the outer perimeter. At least some of the receptacles could instead extend outwardly into the part that wraps around the inner portion or component, in which case the inner portion or component defines the retainer for those receptacles. Each receptacle defines a receptacle opening at the outer perimeter of the base block. A retainer as an inner perimeter with a retainer inner perimeter shape that corresponds to the base block outer perimeter shape. The retainer arranged outwardly of the base block with the base block nested inside the retainer. The retainer may provide strap-like containment of the routed components within the base block.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
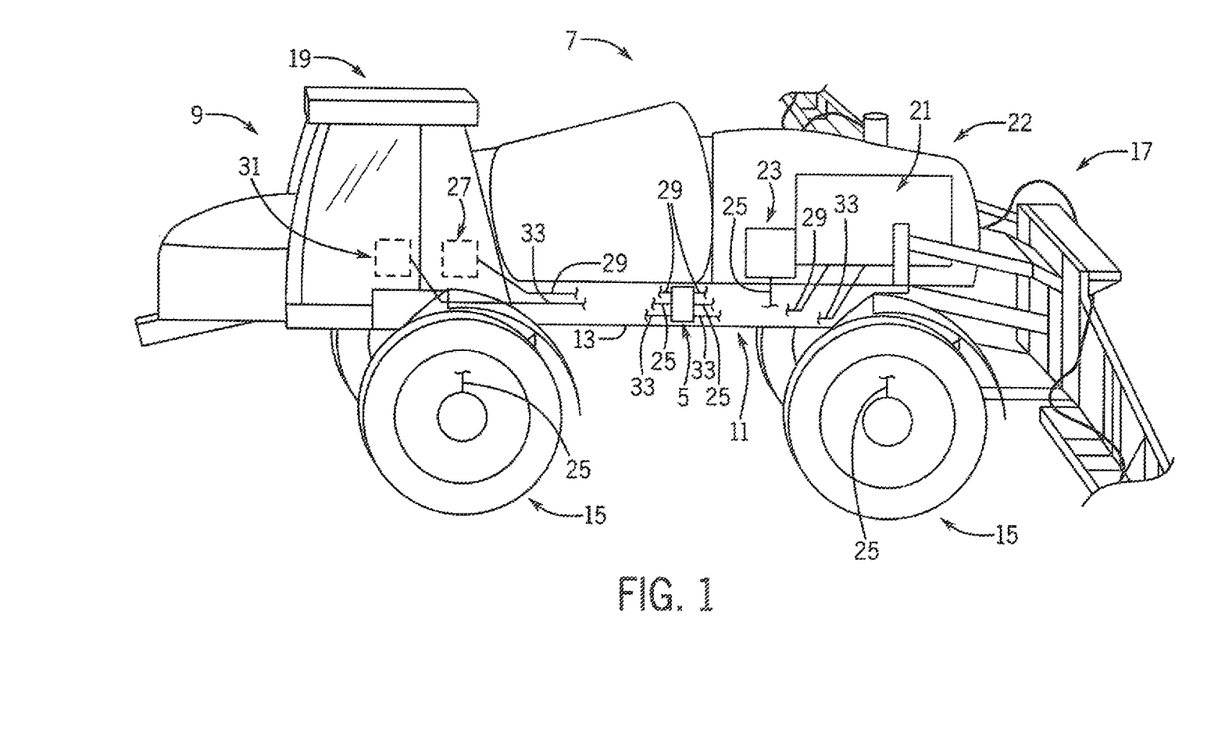
FIG. 1 is a side elevational view of a vehicle shown as an off-road agricultural, vehicle with a routing and securing system with nested support arrangement according to the present invention.

Referring now to the drawings and specifically to the simplified and partially schematic representation of FIG. 1, a routing and securing system, shown as system 5 with nested components, is provided to route and secure hoses, lines, and harnesses. System 5 is shown used with vehicle 7. Vehicle 7 is shown as an off-road agricultural vehicle 7, represented here as a self-propelled sprayer 9, such as those available from CNH Industrial as the Case IH Patriot® Series Sprayers. Although off-road agricultural vehicle 7 is shown as sprayer 9, it is understood that off-road agricultural vehicle 7 may include other self-propelled implements, tractors, or other off-road agricultural vehicles 7. It is understood that vehicle 7 may be other self-propelled vehicles and also towed implements requiring routing of elongate routed components.

Referring again to FIG. 1, sprayer 9 includes chassis 11 having chassis frame 13 that supports wheels 15 and various other assemblies, systems, and components. These various assemblies, systems, and components include product application system 17, cab 19, and engine 21 housed in engine compartment 22 for delivering power for machine functions of sprayer 9.

Still referring to FIG. 1, hydraulic system 23 receives power from engine 19 and includes at least one hydraulic pump which may be in a hydrostat arrangement for providing hydraulic pressure for various hydraulic components of sprayer 9. For hydraulic drive implementations of sprayer 9, hydraulic system 23 provides hydraulic pressure for operating hydraulic motors that are operably connected to the hydraulic pump(s) for rotating wheels 15 for moving sprayer 9. Hydraulic hoses 25 interconnect the various hydraulic components to each other within hydraulic system 23 and extend at least partially along chassis 11 and may extend from the engine compartment 22 toward cab 19.

Still referring to FIG. 1, electronic system 27 provides electrical power and data transmission to and between in-cab and other electronic components of sprayer 9. Electronic system 27 includes battery(ies) operably connected to an alternator(s) driven by engine 21. Electronic system 27 has various conductors for power and data transmission between components and are shown bundled together to provide wire harness(es) 29 that extends at least partially along chassis 11 and may extend from the engine compartment 22 toward cab 19.

Still referring to FIG. 1, HVAC (heating, ventilation, and air conditioning) system 31 is configured for controlling climate within cab 19 and includes an AC compressor driven by engine 21 and a heater core that may cooperate with a radiator of a cooling package of engine 21. HVAC lines 33, such as heater lines and/or AC lines that interconnect HVAC components to each other and extend at least partially along chassis 11, may extend from engine compartment 22 toward cab 19. It is understood that other lines such as fuel or pneumatic lines may also extend between various components of off-road agricultural vehicle 7 that can be used with system 5.

Figure 2:
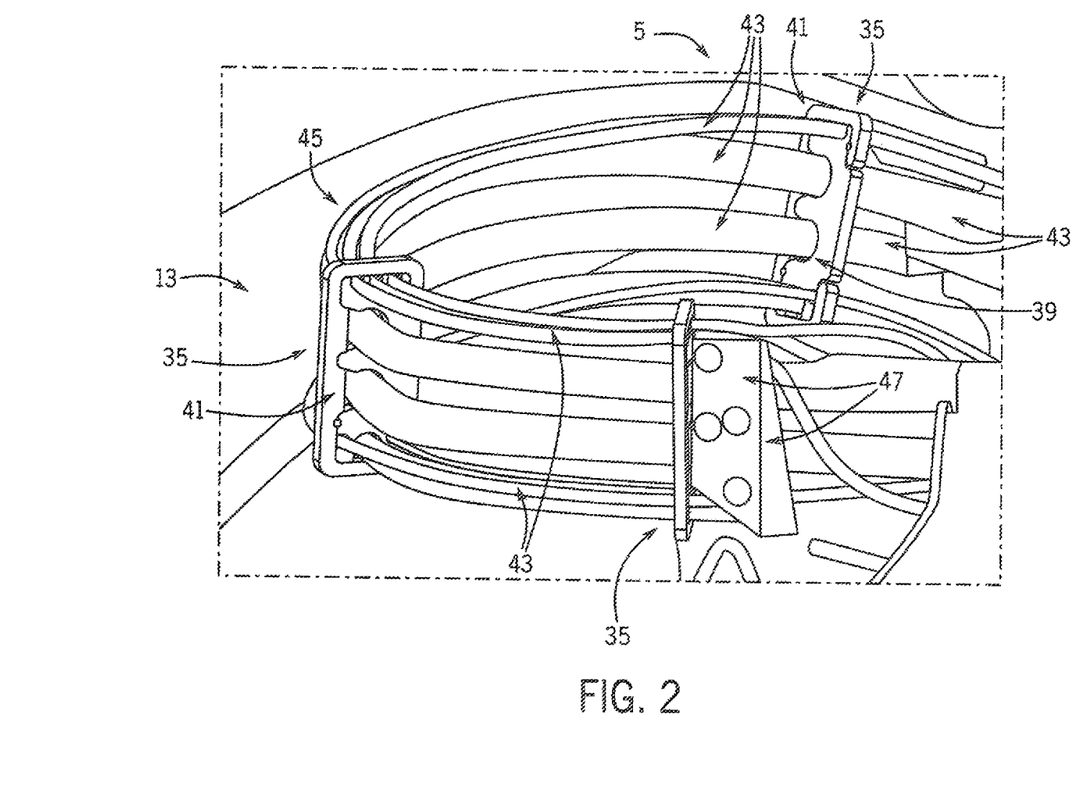
FIG. 2 is a pictorial view of the routing and securing system of FIG. 1.

Referring now to FIG. 2, system 5 includes nested support arrangement 35 with nested components 37 with perimeter shapes that correspond to each other to provide a concentric-type inside-to-outside nested relationship with each other, for example, without transverse stacking but instead with transverse alignment or substantially coplanar with aligned thicknesses when nested support arrangement 35 is in an assembled state. Nested support arrangement 35 is shown here as base block 39 that nests within retainer 41. Nested support arrangement 35 is configured to route and, secure routed components 43 of system 5 as a bundle 45. Nested support arrangement 35 is configured to hold at least some of the adjacent routed components 43 within bundle 45 spaced from each other at a predetermined distance as defined by structures within base block 39 and/or retainer 41 as explained in greater detail elsewhere herein. In this way, routed components 43 within bundle 45 are arranged somewhat loose relative to each other, with at least some of the routed components 43 transversely spaced from each other, which mitigates rubbing of routed components 43 against each other or other components and corresponding abrasive wear while flexing during use of off-road agricultural vehicle 7. Routed components 43 include various ones of tubular and non-tubular members or components, including hydraulic hoses 25, wire harnesses 29, and/or HVAC lines 33. System 5 may implement multiple nested support arrangements 35, shown here with three nested support arrangements 35 that are spaced from each other along the lengths of the routed components 43.

Figure 3:
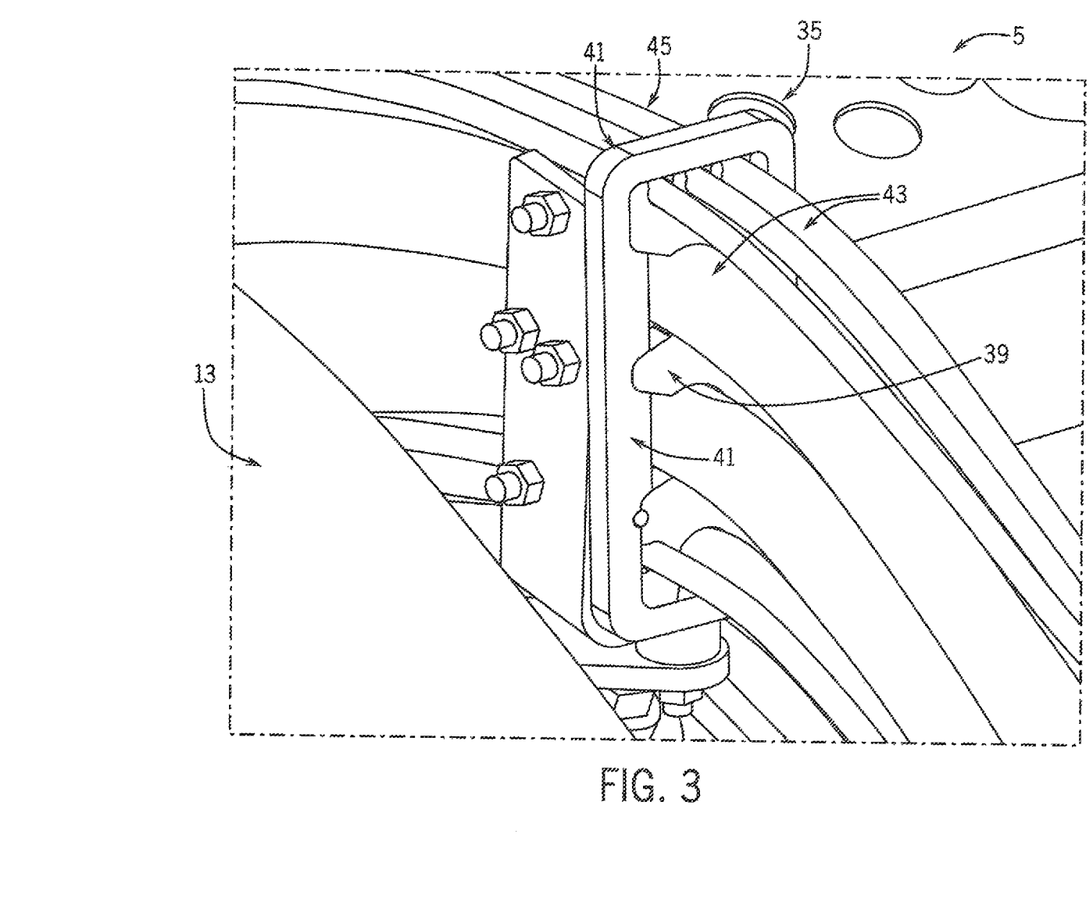
FIG. 3 is enlarged pictorial view a nested support arrangement of FIG. 2.

Referring now to FIGS. 2 and 3, nested support arrangement 35 may be mounted to the chassis frame 13. This may be done by way of bracket 47 shown toward the bottom of FIG. 2 and also shown in FIG. 3 as a bracket-mounted configuration of nested support arrangement 35. It is understood that bracket-mounted configurations of nested support arrangement 35 may not be entirely fixed against movement but may include elastomeric bushings or other isolation-type hardware between various components that allow slight movement of the nested support arrangement 35 relative to the chassis frame 13. The nested support arrangements 35 shown toward the left side and the top of FIG. 2 are in float-mounted configurations in which they are not connected to the chassis frame 13. Float-mounted configurations of nested support arrangements 35 can be used with bracket 45, with the bracket 45 supporting at least some of the routed components 43 and a float-mounted nested support arrangement 35 provided adjacent but separate from the bracket 45. In other words, in the float-mounted configurations, base block 39 is supported from at least some of the routed components 43, which in turn, support the remaining routed components through the nested support arrangement 35. This may include supporting base block 39 from relatively large hydraulic hoses 25 (FIG. 1) such as drive hoses of the propel circuit that are rated for high pressure and are therefore very stiff, which can correspondingly support the relatively more flexible hoses or other routed components 43.

Figure 4:
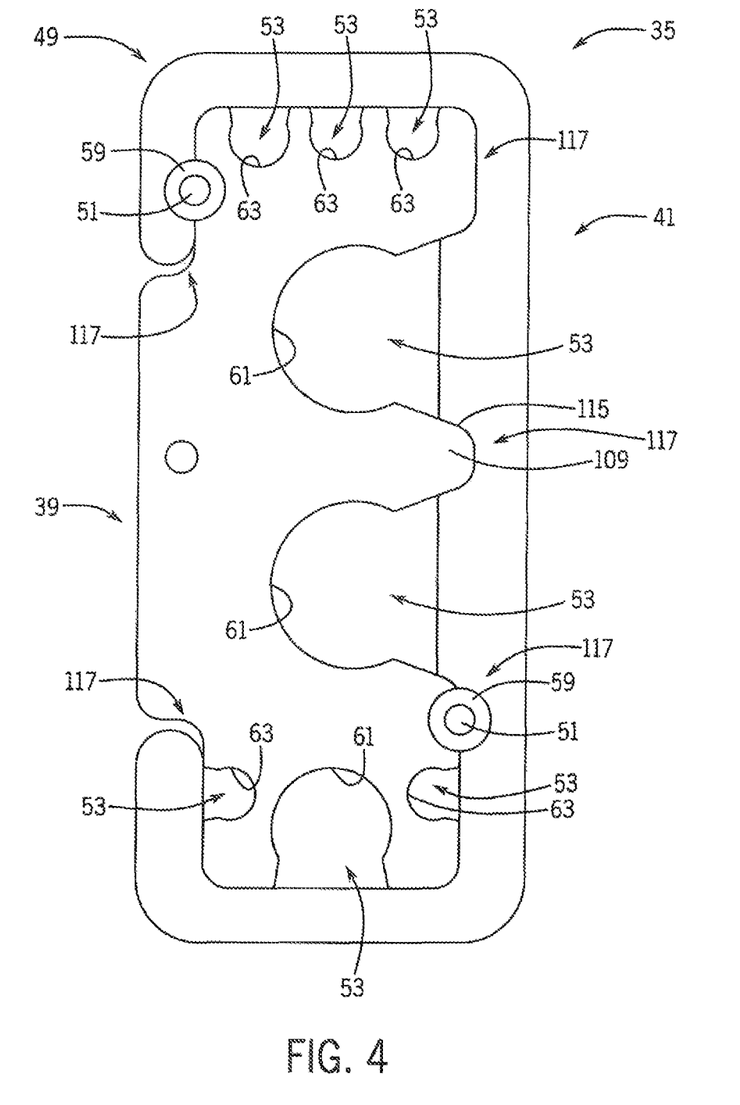
FIG. 4 is a front elevation view of the nested support arrangement of FIG. 2.

Referring now to FIG. 4, base block 39 is nested within retainer 41 by way of corresponding perimeter shape characteristics of the base block 39 and retainer 41. In this way, both the base block 39 and retainer 41 may be cut from a single piece of material in a puzzle-like manner with the base block 39 and retainer 41 provided on opposite sides of a cutting kerf. When the base block 39 is nested within retainer 41, nested support arrangement 35 defines a perforated multicomponent plate 49 with multiple bores that include fastener bores 51 and routing bores 53 which can have circular, square, rectangular, hex and/or irregular perimeter shapes that may be selected to correspond to the configuration of the routed component(s) 43. Fastener bores 51 are configured to receive fasteners 55 (FIG. 5) which may be screws, rivets, or bolts with nuts 57 that secure stops 59 which may be washers or other components that abut and span across the base block 39 and retainer 41 on opposite sides of the multicomponent plate 49 to hold the base block 39 in its nested arrangement within retainer 41.

Still referring to FIG. 4, routing bores 53 are configured to receive and locate routed components 43 within the multicomponent plate 49. Routing bores 53 have different sizes depending on which routed components 43 they are configured to receive. Routing bores 53 are shown here as including relatively large bores 61 that are configured to hold relatively large routed components 43 such as hydraulic hoses 25 that may be for a propel circuit of the off-road agricultural vehicle 7 and/or large wire harnesses 29. Relatively small bores 63 are configured to hold relatively small routed components 43 such as fuel, pneumatic, or HVAC lines 33 and/or relatively small wire harnesses 29.

Figure 5:
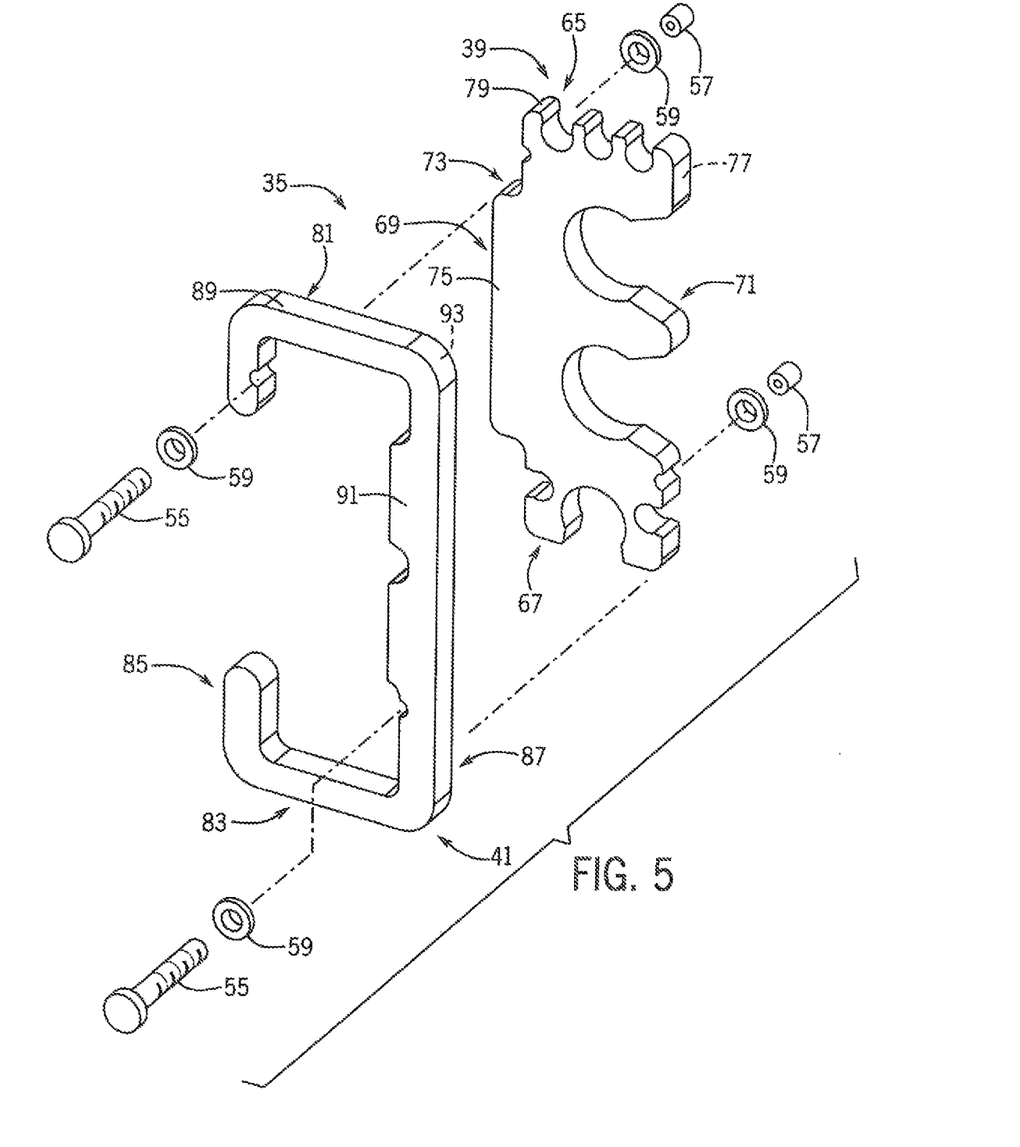
FIG. 5 is an exploded view of the nested support arrangement of FIG. 2.

Referring now to FIG. 5, as shown, base block 39 includes top and bottom segments 65, 67, and opposite side segments 69, 71. Base block perimeter 73 defines a perimeter shape of each of opposing front and back surfaces 75, 77 of base block 39. A thickness of base block 39 is defined by a width of the surface of edge 79 that extends between the opposing front and back surfaces 75, 77. Retainer 41 includes top and bottom segments 81, 83 and opposite side segments 85, 87.

Retainer perimeter 89 defines a perimeter shape of each of opposing front and back surfaces 91, 93 of retainer 41. A thickness of retainer 41 is defined by a width of the surface of edge 95 that extends between the opposing front and back surfaces 91, 93. Base block 39 and retainer 41 are shown with common thicknesses so that each stop 59 engages both base block 39 and retainer 41, which prevents sliding separation of base block 39 and retainer 41 from each other. It is understood that base block 39 and retainer 41 may have different thicknesses so long as they can be sufficiently captured to maintain the multicomponent plate 49 arrangement without separating during use, which may include incorporating stops 59 with stepped segments to compensate for differences in the thicknesses.

Figure 6:
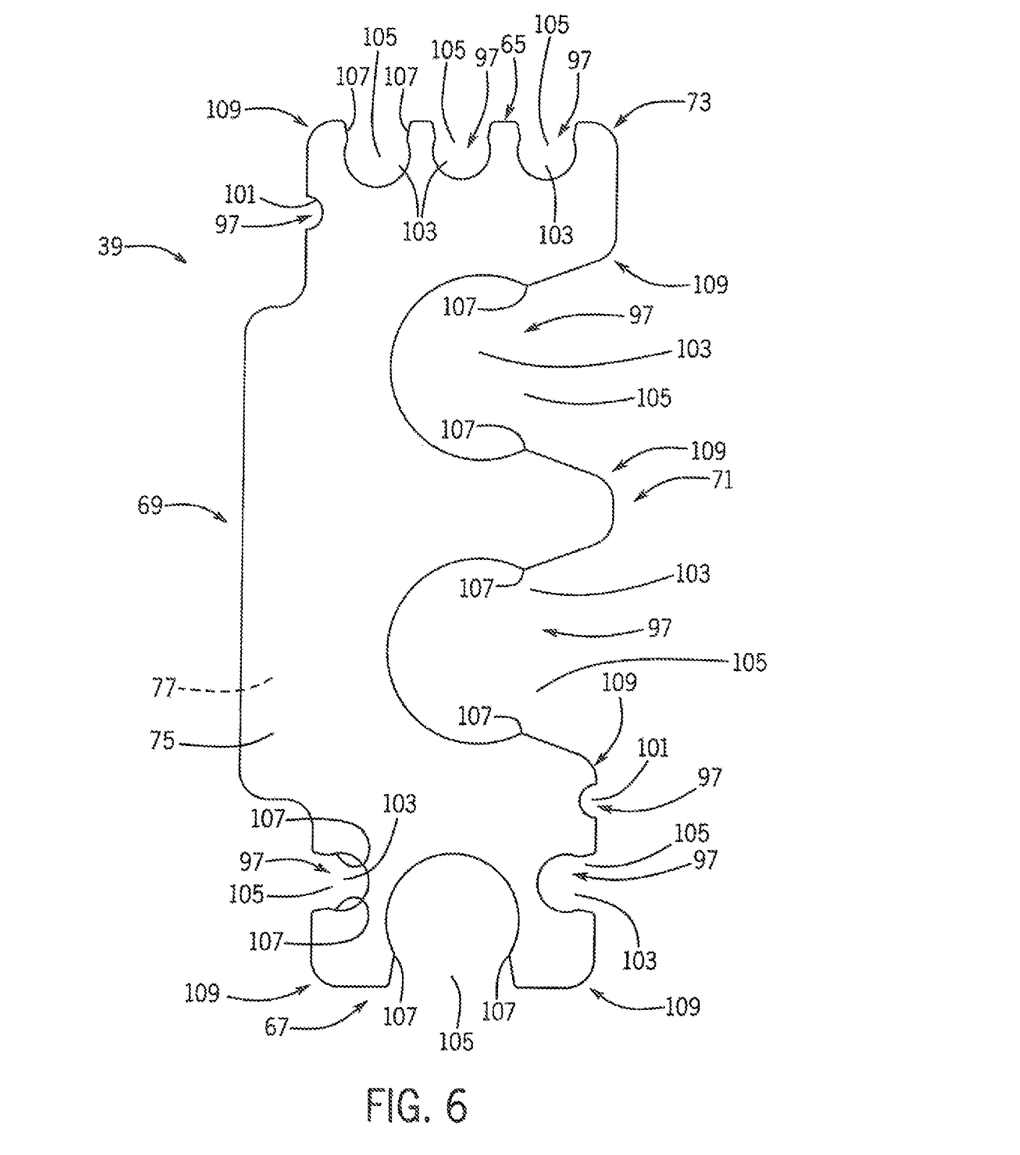
FIG. 6 is a front elevation view of a base block of FIG. 2.

Referring now to FIG. 6, base block 39 includes multiple receptacles 97 that are spaced from each other about base block perimeter 73, with each receptacle 97 extending inwardly into the base block 39 from the base block outer perimeter 73. Receptacles 97 include fastener receptacles 101 and routing receptacles 103. Each fastener receptacle 101 defines a portion of a respective fastener bore 51 (FIG. 4) that receives a fastener 55 (FIG. 4) to clamp the base block 39 and retainer 41 against sliding movement relative to each other. Each routing receptacle 103 defines a portion of a respective routing bore 53 (FIG. 4) that receives a routed component 43 (FIG. 3) and is sized to correspond to the relatively large bore 61 (FIG. 4) or relatively small bore 63 (FIG. 4) based on the size of the routed component 43 (FIG. 3) that will be held in the routing bore 53 (FIG. 4).

Still referring to FIG. 6, each routing receptacle 103 defines an opening 105 through which the routed component 43 (FIG. 3) is inserted. Opening 105 may define an opening minimum width that is smaller than the width of the respective routed component 43 (FIG. 3) held in the routing receptacle 103 so that the routed component 43 (FIG. 3) is snap-fit received into routing receptacle 103. This configuration of an opening minimum width that is smaller than the width of the respective routed component 43 (FIG. 3) is shown in FIG. 6 as a distance between inwardly extending portions 107 between which the opening minimum width of opening 105 is defined. It is understood that the opening minimum width of opening 105 may be the same or larger than the width of the routed component 43 (FIG. 3) held in routing receptacle 103, whereby routed component 43 (FIG. 3) can be freely slid into routing receptacle 103 without radially squeezing routed component 43 (FIG. 3). Portions of the base block 39 that extend outwardly beyond adjacent portions define base block projections 109. Base block projections 109 are shown here as fingers that extend between adjacent routing receptacles 103.

Figure 7:
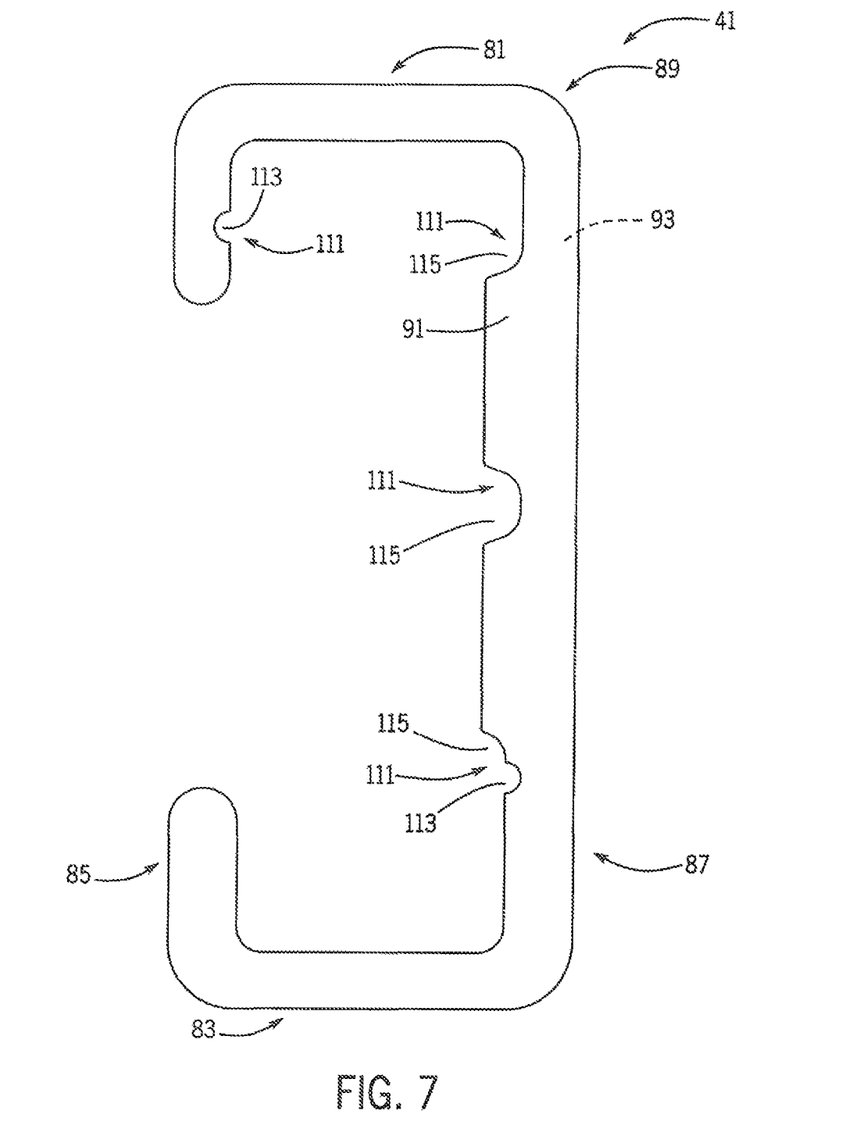
FIG. 7 is a front elevation view of a retainer of FIG. 2.

Referring now to FIG. 7, retainer 41 includes multiple receptacles 111 that are spaced from each other about retainer perimeter 89, with each receptacle 111 extending inwardly into the respective portions of retainer 41 from the retainer perimeter 89. Receptacles 111 include fastener receptacles 113 and base block receiving receptacles 15. Each fastener receptacle 113 defines a portion of a respective fastener bore 51 (FIG. 4) that receives a fastener 55 (FIG. 4) to clamp the base block 39 and retainer 41 against sliding movement relative to each other. Respective pairs of the fastener receptacles 101, 113 of base block 39 and retainer 41 together to define the fastener bores 51 (FIG. 4). Each base block receiving receptacle 115 is configured to capture a portion of the base block 39.

Referring again to FIG. 4, at least one interlocking joint 117 defined between engaging portions of base block 39 and retainer 41 that engage in multiple surfaces through the interlocking joint 117. This may include engagements between corresponding base block projections 109 and base block receiving receptacles 115 to define the respective interlocking joint 117.

Figure 8:
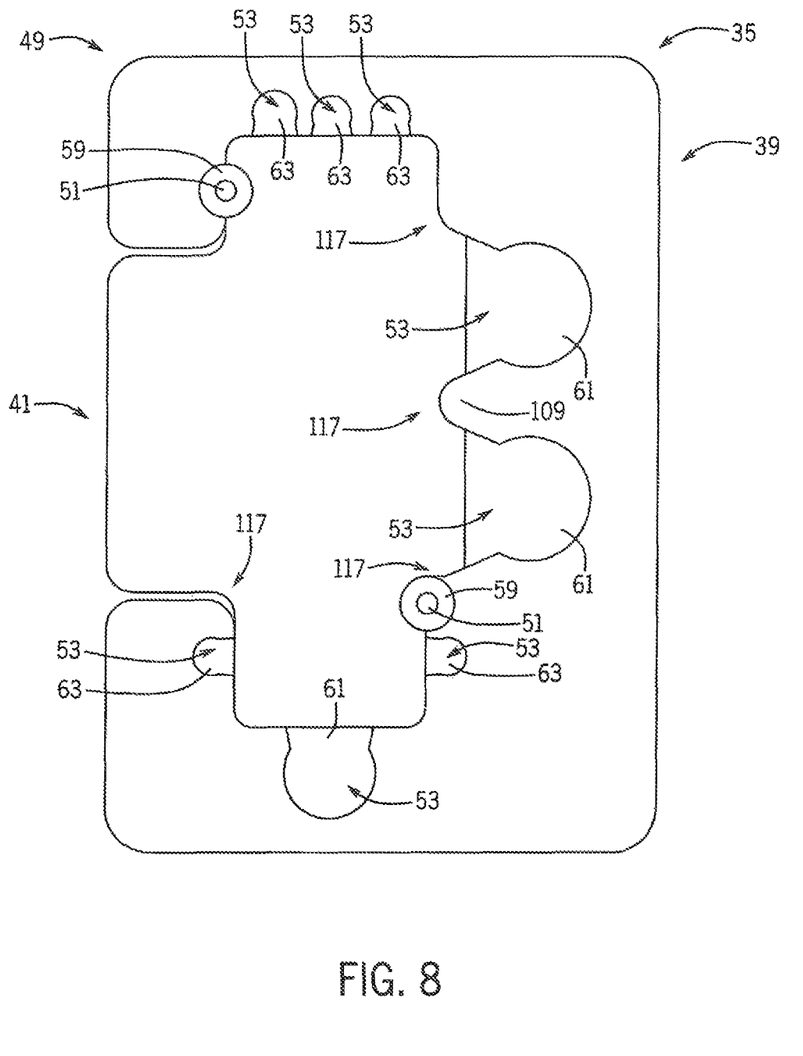
FIG. 8 is a front elevation view of a variant of the nested support arrangement of FIG. 4.

Referring now to FIG. 8, this nested support arrangement 35 is the same as that shown in FIG. 4, whereby the description(s) of FIG. 4 is equally applicable here, only differing in the following ways. Instead of retainer 41 arranged outwardly of block 39 as shown in FIG. 4, in FIG. 8 the retainer 41 is the inwardly disposed component of nested support arrangement 35. Base block 39 is shown arranged outwardly of retainer 41. Routing bores 53 and the corresponding receptacles extend into the outwardly disposed base block 39. It is understood that different ones of the routing bores 53 may extend into different ones of the inner and outer components that define the nested support arrangement 35, whereby each of the base block 39 and retainer 41 may have segments that perform holding and retaining functions. The same is the case for the interlocking features of interlocking joint 117, whereby projections and receiving receptacles may be formed on either or both of the inner and outer components that define the nested support arrangement 35.

Many changes and modifications could be made to the invention without departing from the spirit thereof. The scope of these changes will become apparent from the appended claims.

We claim:

1. A routing and securing system with nested support arrangement for routing and securing routed components of a vehicle having a chassis, the system comprising:
   multiple routed components extending between different locations relative to the chassis;
   a nested support arrangement for routing and securing the routed components relative to the chassis, the nested support arrangement comprising:
      a base block having a base block perimeter defining a shape including multiple receptacles that are spaced from each other and extending into the base block from the base block perimeter, each receptacle defining a receptacle opening at the base block perimeter configured to receive a routed component therethrough;
      a retainer having a perimeter and recess formed in the perimeter of the retainer, the recess defined by a surface having a shape that corresponds to the base block perimeter shape; and
      a fastener extending along an axis and being configured to interconnect the base block and the retainer;
   wherein:
      the base block is receiveable in the recess of the retainer so as to define a nested relationship with respect to each other so that the retainer prevents removal of the routed component out of the receptacle opening of the base block;
      the base block and the retainer lie in a generally common plane with the base block received in the recess of the retainer;
      the axis of the fastener is transverse to the common plane.

2. The system of claim 1 wherein at least one of the receptacles extends inwardly into the base block from the base block perimeter and defines a receptacle opening at the base block perimeter.

3. The system of claim 1 wherein the base block perimeter of the base block is defined by a base block outer edge, wherein the surface of the retainer and the base block outer edge engage each other.

4. The system of claim 1 wherein the routed components include ones of hoses, lines, and wire harnesses.

5. The system of claim 1 wherein the base block is supported from the chassis of the vehicle.

6. The system of claim 1 wherein the base block is supported from at least one of the routed components.

7. The system of claim 1 further comprising at least one interlocking joint defined between the base block and the retainer.

8. The system of claim 7 wherein the at least one interlocking joint includes a projection and a receptacle that receives the projection.

9. The system of claim 8 wherein the base block includes at least one base block projection the defines a base block projection shape and the retainer includes at least one retainer receptacle the defines a retainer receptacle shape corresponding to the base block projection shape, and wherein the base block projection is received in the retainer receptacle.

10. The system of claim 1 wherein at least one receptacle opening defines an opening minimum width that is smaller than the width of the respective routed component held in the opening and the routed component snap-fit received into the receptacle.

11. The system of claim 1 wherein at least one receptacle opening defines an opening minimum width that is the same or larger than the width of the respective routed component held in the opening and the routed component is slid into the receptacle.

12. The system of claim 1 wherein the nested support arrangement includes at least one bore with the fastener extending through the bore to lock the base block and the retainer in a fixed position with respect to each other.

13. The system of claim 12 further comprising a pair of stops on opposite sides of the nested support arrangement to hold the base block within the retainer.

14. The system of claim 13 wherein the pair of stops is defined by a pair of washers through which the fastener extends.

15. The system of claim 14 wherein the base block and retainer have a common thickness so that the base block and retainer are sandwiched between the pair of washers with the washers contacting each of the base block and retainer.

16. A routing and securing system with nested support arrangement for routing and securing routed components of a vehicle having a chassis, the system comprising:
multiple routed components extending between different locations relative to the chassis; and
a nested support arrangement for routing and securing the routed components relative to the chassis, the nested support arrangement comprising:
a base block having a base block perimeter defining a first perimeter shape;
a retainer having a retainer perimeter and a recess formed therein, the recess is defined by a surface having shape; and
a fastener extending along an axis and being configured to interconnect the base block and the retainer;
wherein:
the base block perimeter and the surface of the retainer are complementary such that the base block and retainer fit in a nested relationship in an assembled state with the base block and the retainer lying in a generally common plane and at least portions of the base block perimeter and the surface of the retainer engaging each other;
the axis of the fastener is transverse to the common plane; and
when the nested support arrangement is in the assembled state, the base block and the retainer define multiple receptacles extending into at least one of the base and retainer to receive the multiple routed components.

* * * * *